US012756351B2

(12) United States Patent
Cassagne

(10) Patent No.: US 12,756,351 B2
(45) Date of Patent: Oct. 6, 2026

(54) PHOTOVOLTAIC MODULE AND ASSEMBLY

(71) Applicant: TOTALENERGIES RENEWABLES, Courbevoie (FR)

(72) Inventor: Valérick Cassagne, Limours (FR)

(73) Assignee: TOTALENERGIES RENEWABLES, Courbevoie (FR)

( * ) Notice: Subject to any disclaimer, the term of this patent is extended or adjusted under 35 U.S.C. 154(b) by 0 days.

(21) Appl. No.: 17/610,926

(22) PCT Filed: May 15, 2020

(86) PCT No.: PCT/EP2020/063586
§ 371 (c)(1),
(2) Date: Nov. 12, 2021

(87) PCT Pub. No.: WO2020/229652
PCT Pub. Date: Nov. 19, 2020

(65) Prior Publication Data

US 2022/0247344 A1 Aug. 4, 2022

(30) Foreign Application Priority Data

May 15, 2019 (EP) .................................... 19305620

(51) Int. Cl.
*H02S 40/34* (2014.01)
*H02S 20/23* (2014.01)

(52) U.S. Cl.
CPC .............. *H02S 20/23* (2014.12); *H02S 40/34* (2014.12)

(58) Field of Classification Search
None
See application file for complete search history.

(56) References Cited

U.S. PATENT DOCUMENTS

2012/0151856 A1* 6/2012 Azoulay ................ H02S 40/36 52/173.3
2012/0222726 A1 9/2012 Qin et al.
(Continued)

FOREIGN PATENT DOCUMENTS

EP 0828034 3/1998
FR 3073106 10/2017
(Continued)

OTHER PUBLICATIONS

Office Action for counterpart application in Japan (2021-560872) issued Aug. 15, 2024; Japanese with English translation.
(Continued)

*Primary Examiner* — Dustin Q Dam
(74) *Attorney, Agent, or Firm* — Dilworth IP, LLC

(57) ABSTRACT

The invention relates to a photovoltaic assembly (100) for installation on a sloped roof, comprising # a plurality of photovoltaic modules (1*a*, 1*b*, . . . ), arranged in at least one column parallel to the slope (S), each photovoltaic module (1*a*, 1*b*, . . . ) comprising: # a laminate (11) of rectangular shape, with two slope sides (SS) to be placed parallel to the slope (S) of the roof and two horizontal sides (HS) to be placed perpendicular to the slope (S), # a plurality of photovoltaic cells (13), disposed in the laminate (11), # at least two monopole junction boxes (15*a*, 15*b*), comprising a first junction box (15*a*) attached respectively at the corner between one of the first or second slope side (SS) and a first horizontal side (HS), and a second junction box (15*b*) attached at the corner between the same first or second slope side (SS) and the second horizontal side (HS), connected to the photovoltaic cells (13), the junction boxes (15*a*, 15*b*) of the photovoltaic modules (1*a*, 1*b*, . . . ) being close to the same slope side (SS) of the photovoltaic modules (1*a*, 1*b*, . . . ) # connection and collecting cables (19, 21).

14 Claims, 2 Drawing Sheets

(56) References Cited

U.S. PATENT DOCUMENTS

| | | | | |
|---|---|---|---|---|
| 2014/0305493 | A1 | 10/2014 | Dhir et al. | |
| 2015/0326177 | A1* | 11/2015 | Koehler | H02S 40/34<br>29/857 |

FOREIGN PATENT DOCUMENTS

| | | |
|---|---|---|
| JP | S 52-156590 | 12/1977 |
| JP | H 8-172212 | 7/1996 |
| JP | 2000-027394 | 1/2000 |
| JP | 2001-267617 | 9/2001 |
| JP | 2002-043607 | 2/2002 |
| JP | H 9-213983 | 12/2002 |
| JP | 2004-186548 | 7/2004 |
| JP | 2005-107674 | 4/2005 |
| JP | 2011-157713 | 8/2011 |
| JP | 2011-176139 | 9/2011 |
| JP | 2014-103132 | 6/2014 |
| JP | H 6-085305 B | 1/2015 |
| WO | 2013086265 | 6/2013 |

OTHER PUBLICATIONS

Office Action for counterpart application in Japan issued Mar. 29, 2024; Japanese with English translation.
Office Action for counterpart application in India issued Dec. 6, 2023.
Letter regarding Office Action for counterpart application in India issued Dec. 6, 2023.

* cited by examiner

PHOTOVOLTAIC MODULE AND ASSEMBLY

CROSS REFERENCE TO RELATED APPLICATION

This application is a U.S. National Phase of International Application No. PCT/EP2020/063586, filed May 15, 2020, which claims priority to European Patent Application No. 19305620.7, filed May 15, 2019, both of which are incorporated by reference herein in their entirety.

TECHNICAL FIELD OF THE INVENTION

The present invention relates to a photovoltaic assembly, in particular for installation on a sloped roof.

BACKGROUND OF THE INVENTION

The photovoltaic assembly comprises photovoltaic modules with photovoltaic cells for generating electrical power from solar radiation, and different cables and electrical devices for collecting the generated electrical current.

An important portion of habitat buildings, among others, comprise sloped roofs. The sloped roofs can be made of corrugated metal sheet, tiles etc. The sloped roofs offer an interesting surface for the installation of photovoltaic modules. The slope of the roof allows evacuation of rainwater falling on said roof.

Photovoltaic modules comprise a flat support sheet or plate, photovoltaic cells and connecting elements such as junction boxes. They allow for generation of electrical current using solar radiation. The installation of photovoltaic modules on roofs offers economically and ecologically interesting power for light, heat and appliances, either as primary electric power source or as a secondary, supplementary source.

The photovoltaic modules are then integrated in a photovoltaic assembly, comprising a plurality of modules, connection cables, adapters and additional structural elements such as struts, spacers and frames. It is known to place the photovoltaic modules against the roof surface to minimize sheltered space underneath said modules where filth and small animals can find shelter.

In particular on roof membranes or on corrugated metal sheets, the weight of the photovoltaic assembly must often be reduced. It is known to install laminated photovoltaic modules directly on the surface, preferably by gluing to avoid any penetration in the roof. Light laminated modules are obtained by laminating the photovoltaic cells between protective plastic sheets with encapsulating resin. In this case to avoid specific CMS shape or holes in the roofing materials, the junction box and the cables are placed on the upfront side i.e. the sunny side.

The photovoltaic modules are in particular arranged in lines and columns. To interconnect the modules of a horizontal line, cables are arranged between them, with a sensibly horizontal direction, perpendicular to the slope.

The horizontally arranged cables against the roof or module surface form obstacles to the water flow, which occurs parallel to the slope. In particular, debris and particles, for example of decaying tree leaves, can consequently accumulate against the cables, clogging the water flow under said cables. The accumulated matter and humidity against the cable accelerates the degradation of said cables, while pooling water can end up covering a portion of the photovoltaic cells, smudging the front surface above the cells.

The life expectancy of the module is consequently shortened, while the overall electrical efficiency of the photovoltaic assembly is reduced.

In particular, in the case of corrugated metal sheet roofs where the photovoltaic modules are installed at the bottom of trenches separated by ridges, the horizontal cables and the ridges form in combination important pooling spaces for rainwater. The installation of horizontal cables over the ridges is technically complicated and not aesthetic, while the cables on top of the ridges generate a bigger shadow.

SUMMARY OF THE INVENTION

In order to overcome the aforementioned drawbacks, the invention proposes a photovoltaic assembly for installation on a sloped roof, comprising

- a plurality of photovoltaic modules, arranged in at least one column parallel to the slope, each photovoltaic module comprising:
  - a laminate of rectangular shape, with two slope sides to be placed parallel to the slope of the roof and two horizontal sides to be placed perpendicular to the slope,
  - a plurality of photovoltaic cells, disposed in the laminate,
  - at least two monopole junction boxes, comprising a first junction box attached respectively at the corner between one of the first or second slope side and a first horizontal side, and a second junction box attached at the corner between the same first or second slope side and the second horizontal side, connected to the photovoltaic cells, the junction boxes of the photovoltaic modules being close to the same slope side of the photovoltaic modules,
- connection cables, spanning between the second junction box of a photovoltaic module and the first junction box of the next photovoltaic module in the photovoltaic module column,
- collecting cables, configured to connect the photovoltaic modules to an electric collector.

This particular architecture with cables parallel to the water flow along the slope reduces the spots where said water and organic matter carried by the water accumulates for longer periods.

The photovoltaic assembly according to the invention may also present one or more of the following features taken separately or in combination.

The photovoltaic cells may be arranged in columns, parallel to the slope sides, with at least one connecting electric track comprising connection segments connecting one photovoltaic cell to the next in a column of photovoltaic cells and the first respectively last photovoltaic cell of the first respectively last column of the arrangement to a junction box, and U-shapes, connecting the last photovoltaic cell of a column to the first photovoltaic cell of the next column in the arrangement.

The photovoltaic modules may comprise an uneven number of photovoltaic cell columns.

The photovoltaic cells may be arranged in lines, parallel to the horizontal sides, with at least one connecting electric track comprising connection segments connecting one photovoltaic cell to the next in a line of photovoltaic cells and the first respectively last photovoltaic cell of the first respectively last line of the arrangement to a junction box, and U-shapes, connecting the last photovoltaic cell of a line to the first photovoltaic cell of the next line in the arrangement.

The photovoltaic modules may comprise an even number of photovoltaic cell lines.

The assembly may comprise one return cable for each column of photovoltaic modules, which runs parallel to the slope sides of photovoltaic modules, connecting a junction box of the last photovoltaic module of the column or line to an electric collector or to a junction box of the first photovoltaic module of a next column or line.

The return cable and at least portions of the connecting cables may be enclosed inside a cable sheath, the cable sheath being parallel to the slope sides of the photovoltaic modules.

The photovoltaic modules may comprise a return electric track, embedded in the module and parallel to the slope side, wherein:

- the return electric track of one module is connected to the return electric track of the next module in the column,
- the return electric track of the first photovoltaic module in a column being also connected to a collecting cable, and
- the return electric track of the last photovoltaic module in a column being connected to a junction box of said last photovoltaic module of the column.

The invention also relates to a photovoltaic module for use in a photovoltaic assembly as described above, characterized in that it comprises:

- a laminate of rectangular shape, with two slope sides placed, when installed, parallel to the slope of the roof and two horizontal sides to be placed, when installed, perpendicular to the slope,
- a plurality of photovoltaic cells, disposed on the laminate,
- at least two monopole junction boxes, comprising a first junction box attached respectively at the corner between one of the first or second slope side and a first horizontal side, and a second junction box attached at the corner between the same first or second slope side and the second horizontal side, connected to the photovoltaic cells, the junction boxes of the photovoltaic module being close to the same slope side of the photovoltaic module.

The photovoltaic cells may be arranged in an uneven number of columns, parallel to the slope sides, with at least one connecting electric track comprising connection segments connecting one photovoltaic cell to the next photovoltaic cell in a column and the first respectively last photovoltaic cell of the first respectively last column of the arrangement to a junction box, and U-shapes, connecting the last photovoltaic cell of a column to the first photovoltaic cell of the next column in the arrangement.

The photovoltaic cells may be arranged in an even number of lines, parallel to horizontal sides of the laminate, with at least one connecting electric track comprising connection segments connecting one photovoltaic cell to the next photovoltaic cell in a line and the first respectively last photovoltaic cell of the first respectively last line of the arrangement to a junction box, and U-shapes, connecting the last photovoltaic cell of a line to the first photovoltaic cell of the next line in the arrangement.

The photovoltaic module may comprise a return electric track, parallel to its slope side.

Finally, the invention also concerns a corrugated sheet, for installation on a roof or structure, characterized in that it comprises at least one photovoltaic module as described above, attached to its upper side, with the slope sides parallel to ridges of the corrugated sheet.

BRIEF DESCRIPTION OF THE DRAWINGS

Other characteristics and features of the invention will become apparent in the description hereafter, given in an exemplary and non-limiting fashion, in combination with the figures, among which.

The description refers to particular embodiments, represented in the figures. In particular, the same reference applies to the same element or an equivalent element in all embodiments. Also, different embodiments can be obtained by slightly modifying or combining the different embodiments.

Adjectives and characteristics such as “above” “under” “horizontal” “vertical” etc. are given in relationship with the figures and/or the direction of e.g. rainwater flowing under the effect of gravity when considering the assembly installed on a sloped roof.

DETAILED DESCRIPTION OF THE INVENTION

Figure 1:
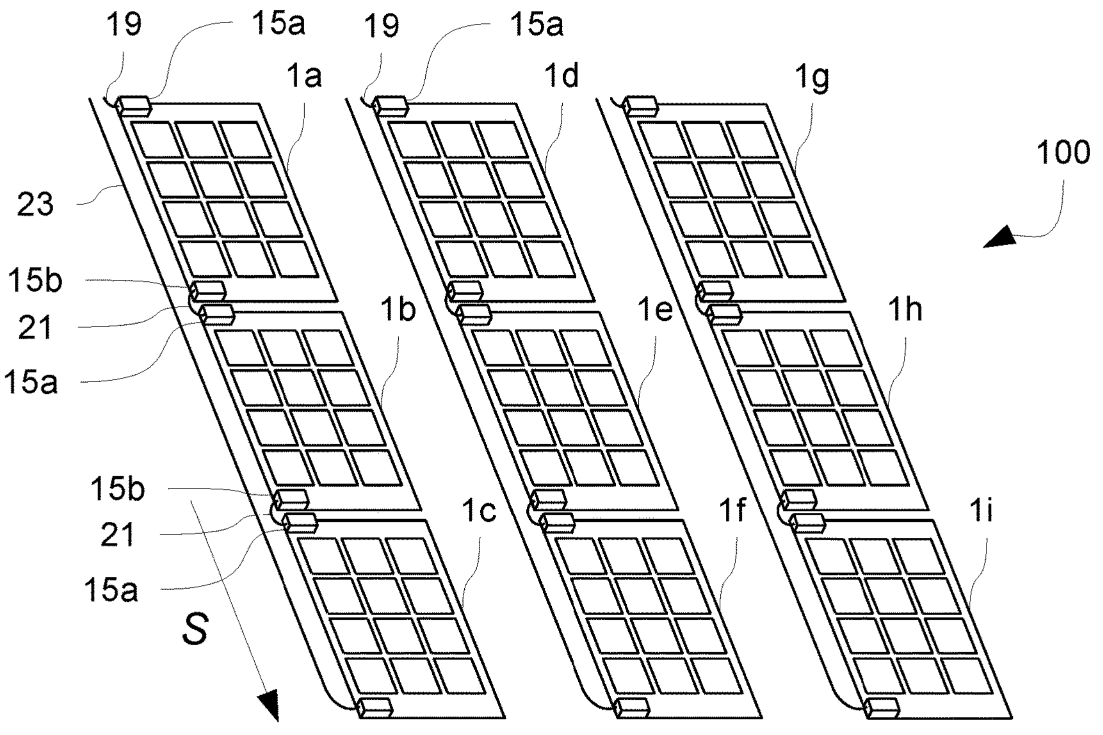
FIG. 1 is a schematic view of part of a photovoltaic assembly according to one embodiment of the invention.

FIG. 1 is a schematic representation in perspective of a photovoltaic assembly 100, arranged on a sloped roof. The roof is for example the sloped roof of a habitat, storage or other building such as a house, garage, hut, storage unit etc.

The sloping direction, meaning the direction in which declivity is maximal, is represented by an arrow S. The sloping direction S also corresponds to the mean flowing direction of rainwater under normal conditions.

The photovoltaic assembly 100 comprises a plurality of photovoltaic modules labelled 1*a*, 1*b*, 1*c* etc. In particular, the modules 1*a*, 1*b*, 1*c* etc. are arranged in columns along the sloping direction S. The reference 1 is used to designate any photovoltaic module without consideration of order in the assembly 100.

In FIG. 1, the assembly 100 comprises three columns, comprising each three modules labelled 1*a* to 1*i*. The columns are then connected either in series or parallel according to the desired voltage and current.

A single module, labelled 1, is represented in front view in FIG. 2. The module 1 comprises a module body in form of a laminate 11 of rectangular shape, with two slope sides SS, parallel to the sloping direction S when installed, and two horizontal sides HS perpendicular to the sloping direction S.

The module 1 comprises photovoltaic cells 13*a*, 13*b* etc. arranged in columns, parallel to the sloping direction S, and here in particular in rows parallel to the horizontal sides HS. The reference 13 is used to designate any photovoltaic cell in a module without consideration of position in said module.

The photovoltaic cells 13*a*, 13*b* etc. are for example monocrystalline silicon cells, thin enough (few tens or hundreds of micrometres) so as to remain flexible in that a curvature can be applied to them without loss of structural and electric properties. The laminate 11 may then in particular be a flexible sheet, and the cells 13*a*, 13*b* etc. are laminated to form the laminate 11 with encapsulating resin and a transparent front sheet to form the photovoltaic module 1.

Figure 2A:
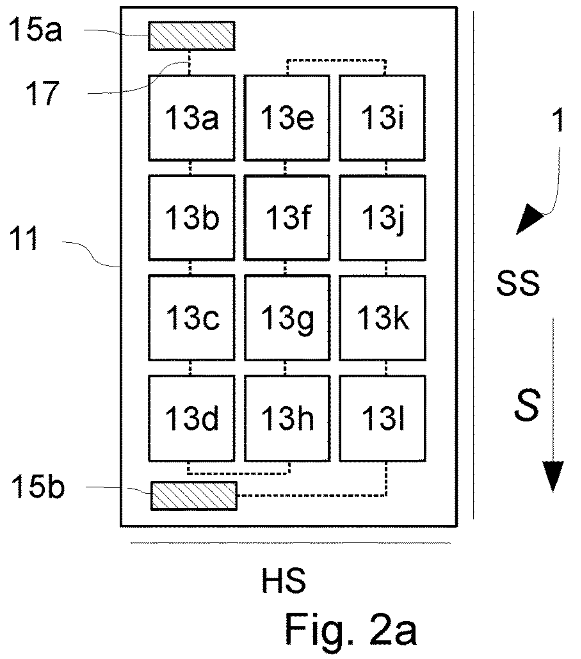
FIGS. 2*a*, 2*b* are a schematic view of a single module of the assembly of FIG. 1.

The represented embodiment in FIG. 2*a* comprises twelve photovoltaic cells labelled 13*a* to 13*l*. Said cells 13*a* to 13*l* are arranged in three columns of each four cells.

The module 1 also comprises two junction boxes 15*a*, 15*b*, comprising a first junction box 15*a* attached respectively at the corner between one of the slope sides SS and a first, upper, horizontal side HS, and a second junction box 15*b* at the corner between the slope side SS and the second, lower, horizontal side HS.

In particular, the junction boxes 15*a*, 15*b* are placed on the same horizontal side (along a single slope side SS) of the laminate 11. The junction boxes 15*a*, 15*b* are monopole junction boxes.

The junction boxes 15*a*, 15*b* and the cells 13*a* to 13*l* in FIG. 2 are connected through one connecting electric track 17. The electric track 17 comprises for example metallic ribbons encapsulated with the cells 13*a* to 13*l*.

The electric track 17 comprises connection segments connecting one photovoltaic cell 13*a* to 13*k* to the next in a column (13*b* to 13*l*). Two connecting segments connect for one the first photovoltaic cell 13*a* of the first column to the first junction box 15*a*, and for the other the last cell 13*l* of the last column to the second junction box 15*b*.

Portions of the electric track 17 are formed as U-shapes, connecting the last cell (13*d*, 13*h*) of a column to the first cell (13*e*, 13*i*) of the next column. In FIG. 2, the first and third columns have their cells 13*a*, 13*b* etc. labelled from top to bottom (in FIG. 2), while the second column has its cells 13*e* to 13*h* labelled from bottom to top.

More generally, using the order as illustrated in FIG. 2*a*, uneven columns would have their cells 13*a*, 13*b* etc. labelled from top to bottom, while even columns would have them labelled from bottom to top.

The cells 13*a*, 13*b* etc. are consequently connected in series, with the connecting electric track 17 forming a zigzag over the successive columns of cells 13*a*, 13*b* etc.

The arrangement with an odd number of cell columns (here three) ensures that the last cell 13*l* is on the same vertical side of the laminate 11 as the second junction box 15*b*, while the first cell 13*a* is on the same side as the first junction box 15*a*.

Figure 2B:
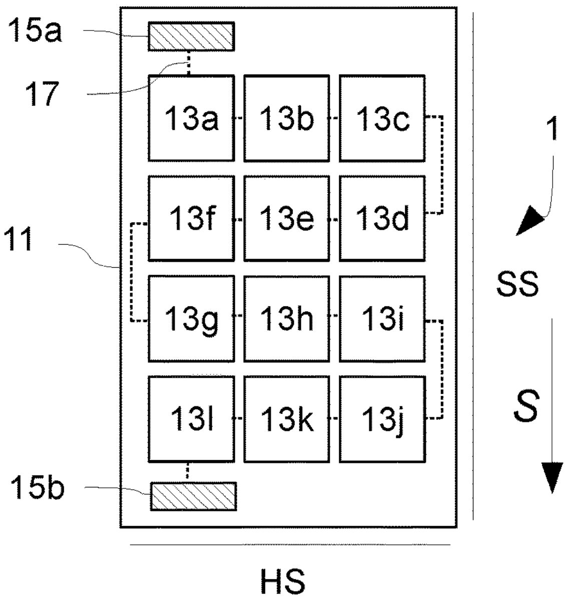

FIG. 2*b* transposes the considerations of FIG. 2*a* to a connection of the cells connected in lines parallel to the horizontal sides HS, with an even number of lines.

The represented embodiment in FIG. 2*b* comprises twelve photovoltaic cells labelled 13*a* to 13*l*. Said cells 13*a* to 13*l* are arranged in four lines of each three cells.

The module 1 also comprises a first junction box 15*a* placed respectively at the corner between one of the slope sides SS and a first, upper, horizontal side HS, and a second junction box 15*b* at the corner between the slope side SS and the second, lower, horizontal side HS, placed on the same horizontal side (along a single slope side SS) of the laminate 11.

The junction boxes 15*a*, 15*b* and the cells 13*a* to 13*l* in FIG. 2 are connected through one connecting electric track 17. The electric track 17 comprises for example metallic ribbons encapsulated with the cells 13*a* to 13*l*.

The electric track 17 comprises connection segments connecting one photovoltaic cell 13*a* to 13*k* to the next in a line (13*b* to 13*l*). Two connecting segments connect for one the first photovoltaic cell 13*a* of the first line to the first junction box 15*a*, and for the other the last cell 13*l* of the last line to the second junction box 15*b*.

Portions of the electric track 17 are formed as U-shapes, connecting the last cell (13*c*, 13*h*) of a line to the first cell (13*d*, 13*i*) of the next line. In FIG. 2*b*, the first and third lines have their cells labelled from left to right (in FIG. 2), while the second and fourth lines have their cells labelled from right to left.

By having an even number of lines, the last cell 13*l* is close to the second junction box 15*b*, and therefore a shorter electric track 17 is needed.

Figure 3:
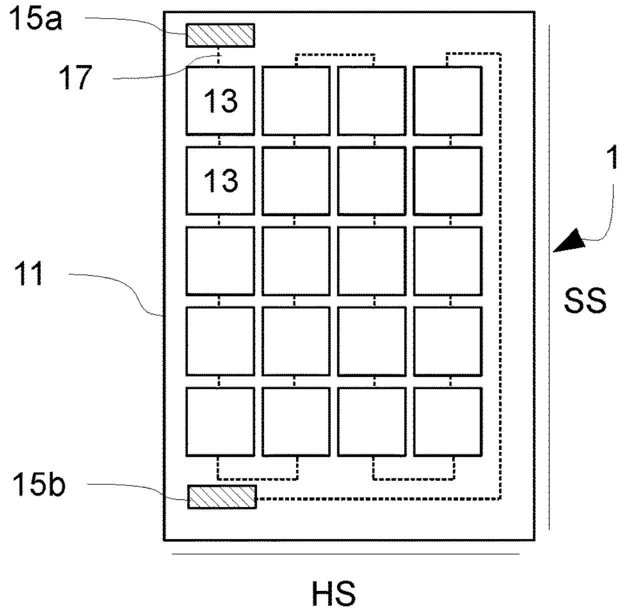
FIG. 3 is a schematic view of a single module of another embodiment of the assembly according to the invention.

FIG. 3 illustrates the case of a module with four (even number) columns. An additional length of connecting electric track 17 is consequently needed to connect the last cell 13 of the last column to the second junction box 15*b*, the two being diagonally opposed on the laminate 11.

Other connection patterns, for example connecting the cells 13*a*, 13*b* etc. in lines or columns connected in parallel to reach a specific current and voltage output are also possible.

Visible on FIG. 1 are connection cables 21 which connect the modules 1*a*, 1*b* etc. through their respective junction boxes 15*a*, 15*b*. In particular, the connection cables 21 connect the second junction box 15*b* of a module 1*a* to the first junction box 15*a* of the next module 1*b* in a column.

Collecting cables 19 connect the modules 1*a*, 1*b* etc. to an electric collector (not represented) to adapt or store the electric power generated by the photovoltaic assembly 100. In particular, in the represented embodiment of FIG. 1, the collecting cables 19 comprise cables connected to the first junction box 15*a* of the first module 1*a*, 1*d*, 1g of each column. In FIG. 1, the return cable 23 is represented going upward but it can go downward.

A return cable 23 is connected to the second junction box 15*b* of the last module 1*c*, 1*f*, 1*i* in a column to the electric collector. The major portion of the return cable 23 runs in particular parallel to the slope sides SS of the laminates 11, along the column of modules 1*a*, 1*b* etc. This solution prevents creating induction loops as stated by professional rules.

Figure 4:
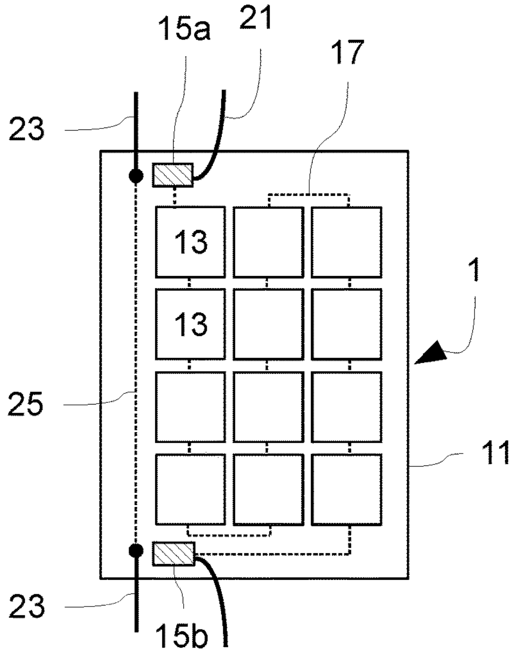
FIG. 4 is a schematic view of a single module of yet another embodiment of the assembly according to the invention.

FIG. 4 is a schematic representation of a single module 1, in which the return cable 23 is embedded by segments inside the module 1*a*, 1*b* etc.

In particular, the photovoltaic module 1 comprises a return electric track 25, embedded in the module 1, for example a metallic ribbon laminated in the same layer as the cells 13 and parallel to the slope side SS.

Connection means, such as secondary junction boxes or sockets form the ends of the return electric track 25.

When assembled the return electric track 25 of one module 1*a* is connected to the return electric track 25 of the next module 1*b* in the column. The electric return track 25 of the first photovoltaic module 1*a* in a column is also connected to a collecting cable 19, and further to the electric collector. The return electric track 25 of the last photovoltaic module 1*c*, 1*f*, 1*i* in a column is connected to the second junction box 15*b* of said last photovoltaic module 1*c*, 1*f*, 1*i* of the column.

To reduce horizontal width of the laminate, the track 25 can pass below the cells, isolated from them by an insulating layer.

Such architecture reduces the length of apparent return cable 23, while offering a modular photovoltaic assembly 100 that is easy to assemble.

Figure 5:
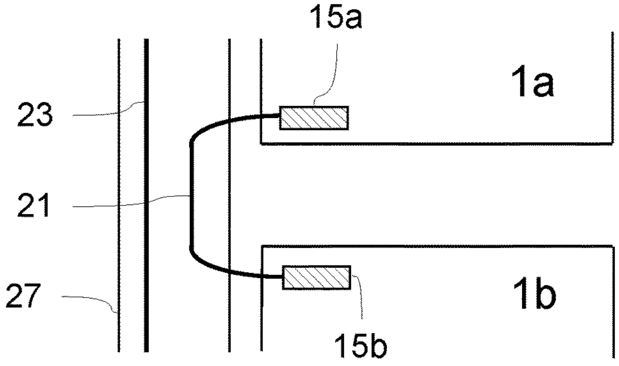
FIG. 5 is a partial view of the interface between two modules of an assembly.

FIG. 5 shows a portion of another particular embodiment of a photovoltaic assembly 100, in particular the area between two successive modules 1*a*, 1*b*. In particular only the lower portion of the first module 1*a* and the upper portion of the second 1*b* are visible.

The junction boxes 15*a*, 15*b* of the two represented modules 1*a*, 1*b* are in particular parallelepipedic with two faces which are parallel to the slope sides SS of the laminate 11. The connection cables 21 are connected to one face parallel to the slope sides SS that faces outwards of the modules 1*a*, 1*b*, via connection means such as sockets.

This way, there is no horizontal dam, preventing any water retention and stagnation on the front surface.

The connection cables 21 and the return cable 23 are in particular enclosed, at least partially in a sheath 27, that runs parallel to the slope sides SS for additional protection.

The sheath 27 is for example a deformable polymer sheath with closing lips, or a rigid cable tray. In particular, reversible closing means allow maintenance and repair by replacement of the contained cables 21, 23.

Figure 6:
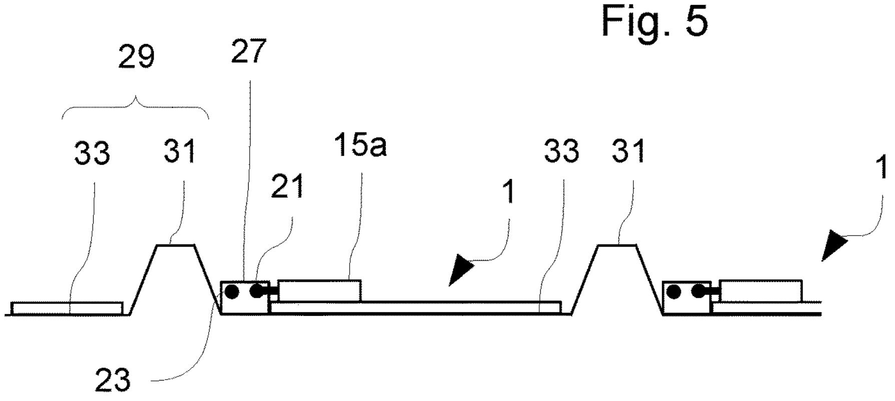
FIG. 6 is a cut-away view of the assembly arranged on a corrugated metal sheet.

FIG. 6 is a cutaway view of a corrugated sheet 29, on which the assembly 100 according to FIG. 5 is installed. In particular, the cutaway plane in perpendicular to the sloping direction S.

The corrugated sheet comprises ridges 31 parallel to the sloping direction S and flat portions 33 between the ridges 31. For example, the corrugated sheet may be a corrugated metal sheet which can be made of steel, aluminium, zinc, polymer etc. or a corrugated sheet of composite based material (e.g. glass fibres and resin).

The photovoltaic modules 1 and the cable sheaths 27 are placed on the flat portions 33. In particular, the cables 21, 23 are placed close to the bottom of a ridge 31, even in embodiments without a cable sheath 27, so as to minimize their visual impact. Placing the cable sheath 27 close to the bottom of a ridge 31 further reduces the shadow it may cast on the photovoltaic module 1 while improving the aesthetic aspect of the assembly 100.

The photovoltaic module 1 according to the invention is particularly suitable for photovoltaic assemblies 100 in columns parallel to the sloping direction S. The particular position of the junction boxes 15*a*, 15*b* allows for a reduced length of connecting cables 21 of horizontal or near horizontal direction. The water flow on the modules 1 of such an assembly is therefore streamlined, and less stagnant water remains even if debris such as fallen leaves is present.

In particular, on a corrugated sheet, the photovoltaic assembly 100 is discretely and efficiently integrated. Photovoltaic modules 1 can be attached directly to the corrugated sheet 29, for example by gluing, with their slope sides SS parallel to ridges 31 of the corrugated sheet 29. The photovoltaic modules 1 are in particular attached or glued to the upper side of the corrugated sheet 29, which is the side that will, when installed, be facing the sky and receive the sunlight.

The corrugated sheets 29 with attached modules 1 can be stored, shipped and handed individually with ease. The installation of the corrugated sheets 29 on a roof or structure is then followed by the installation of the connection and return cables 21, 23, thus leading to the finished photovoltaic assembly 100.

The invention claimed is:

1. A photovoltaic assembly for installation on a sloped roof, comprising:

a plurality of photovoltaic modules, arranged in at least one column parallel to a slope of the sloped roof and configured to be glued to the sloped roof, each photovoltaic module comprising:

a flexible laminate of rectangular shape, with two slope sides to be placed parallel to the slope of the roof and two horizontal sides to be placed perpendicular to the slope, a front surface arranged to face the sun and opposite to a glued surface;

a plurality of photovoltaic cells, disposed in the laminate;

two monopole junction boxes arranged on the front surface of the photovoltaic module, comprising a first junction box attached respectively at a corner between one of the first or second slope side and a first horizontal side, and a second junction box attached at a corner between the same first or second slope side and a second horizontal side, connected to the photovoltaic cells, the two monopole junction boxes of the plurality of photovoltaic modules being close to the same slope side of the plurality of photovoltaic modules;

connection cables, spanning between the second junction box of a photovoltaic module and the first junction box of the next photovoltaic module in the plurality of photovoltaic modules arranged in at least one column; and collecting cables, configured to connect the plurality of photovoltaic modules to an electric collector;

wherein the assembly comprises one return cable for each column of photovoltaic modules, which runs parallel to the slope sides of photovoltaic modules, connecting the second junction box of the last photovoltaic module of the column to an electric collector or to the first module of a next row.

2. The photovoltaic assembly according to claim 1, characterized in that the photovoltaic cells are arranged in columns, parallel to the slope sides, with at least one connecting electric track comprising connection segments connecting one photovoltaic cell to the next in a column of photovoltaic cells and a first (respectively last) photovoltaic cell of a first (respectively) last column of the arrangement to a junction box, and U-shapes, connecting the last photovoltaic cell of a column to the first photovoltaic cell of the next column in the arrangement.

3. The photovoltaic assembly according to claim 2, characterized in that the photovoltaic modules comprise an uneven number of photovoltaic cell columns.

4. The photovoltaic assembly according to claim 1, characterized in that the photovoltaic cells are arranged in lines, parallel to the horizontal sides, with at least one connecting electric track comprising connection segments connecting one photovoltaic cell to the next in a line of photovoltaic cells and a first (respectively last) photovoltaic cell of a first (respectively last) line of the arrangement to a junction box, and U-shapes, connecting the last photovoltaic cell of a line to the first photovoltaic cell of the next line in the arrangement.

5. The photovoltaic assembly according to claim 4, characterized in that the photovoltaic modules comprise an even number of photovoltaic cell lines.

6. The photovoltaic assembly according to claim 4, characterized in that the return cable for each column of photovoltaic modules and at least portions of the connecting cables are enclosed inside a cable sheath, the cable sheath being parallel to the slope sides of the photovoltaic modules.

7. The photovoltaic assembly according to claim 1, characterized in that the plurality of photovoltaic modules comprise a return electric track, embedded in the plurality of photovoltaic modules and parallel to the slope side, wherein:

the return electric track of one photovoltaic module is connected to the return electric track of the next photovoltaic module in the plurality of photovoltaic modules arranged in at least one column;

the return electric track of a first photovoltaic module in a column being also connected to a collecting cable; and the return electric track of a last photovoltaic module in a column being connected to the second junction box of said last photovoltaic module of the column.

8. The photovoltaic module for use in a photovoltaic assembly according to claim 1, characterized in that it comprises:

a flexible laminate of rectangular shape, with two slope sides placed, when installed, parallel to the slope of the roof and two horizontal sides to be placed, when installed, perpendicular to the slope;

a plurality of photovoltaic cells, disposed in the laminate; and at least two monopole junction boxes, comprising a first junction box attached respectively at the corner between one of the first or second slope side and a first horizontal side, and a second junction box attached at the corner between the same first or second slope side and the second horizontal side, connected to the photovoltaic cells, the junction boxes of the photovoltaic module being close to the same slope side of the photovoltaic module.

9. The photovoltaic module according to claim 8, characterized in that the photovoltaic cells are arranged in an uneven number of columns, parallel to the slope sides, with at least one connecting electric track comprising connection segments connecting one photovoltaic cell to the next photovoltaic cell in a column and a first (respectively last) photovoltaic cell of a first (respectively last) column of the arrangement to a junction box, and U-shapes, connecting the last photovoltaic cell of a column to the first photovoltaic cell of the next column in the arrangement.

10. The photovoltaic module according to claim 8, characterized in that the photovoltaic cells are arranged in an even number of lines, parallel to the horizontal sides, with at least one connecting electric track comprising connection segments connecting one photovoltaic cell to the next photovoltaic cell in a line and a first (respectively last) photovoltaic cell of a first (respectively last) line of the arrangement to a junction box, and U-shapes, connecting the last photovoltaic cell of a line to the first photovoltaic cell of the next line in the arrangement.

11. The photovoltaic module according to claim 8, characterized in that the photovoltaic modules comprises a return electric track, parallel to its slope side.

12. A corrugated sheet, for installation on a roof or structure, characterized in that it comprises an upper side with ridges, at least one photovoltaic module according to claim 8, attached to the upper side between the ridges, with the slope sides of the flexible laminate parallel to the ridges of the corrugated sheet.

13. The corrugated sheet according to claim 12, wherein the at least one photovoltaic module is attached to the upper side with glue.

14. The photovoltaic assembly according to claim 1, wherein the one return cable for each column of the photovoltaic modules runs parallel to and along a slope side of each of the photovoltaic modules in the respective column.

* * * * *